United States Patent [19]

Board

[11] Patent Number: 4,600,341
[45] Date of Patent: Jul. 15, 1986

[54] POCKET REDUCING INSERT FOR TOOLHOLDER AND THE LIKE

[76] Inventor: Harry B. Board, 5221 E. River Rd., Grand Island, N.Y. 14072

[21] Appl. No.: 699,186

[22] Filed: Feb. 12, 1985

Related U.S. Application Data

[63] Continuation-in-part of Ser. No. 581,566, Feb. 21, 1984, abandoned, which is a continuation-in-part of Ser. No. 468,072, Feb. 22, 1983, abandoned.

[51] Int. Cl.4 ............................................. B26D 1/00
[52] U.S. Cl. ............................... 407/99; 407/104; 407/112
[58] Field of Search ............... 407/85, 88, 99, 103, 407/104, 107, 108, 112, 113, 120, 111; 408/197

[56] References Cited

U.S. PATENT DOCUMENTS

| | | | |
|---|---|---|---|
| 663,455 | 12/1900 | Muehlberg | 407/104 |
| 1,065,712 | 6/1913 | O'Keefe | 407/99 |
| 2,487,209 | 11/1949 | Anthony et al. | 407/112 |
| 2,848,789 | 8/1958 | Friedline | 407/113 |
| 2,982,008 | 5/1961 | Facknitz | 407/112 |
| 3,027,786 | 4/1962 | Severson | 408/197 |
| 3,028,657 | 4/1962 | Almen | 407/107 |
| 3,102,326 | 9/1963 | Conti et al. | 407/104 |
| 3,175,276 | 3/1965 | Weber et al. | 407/113 |
| 3,343,431 | 9/1967 | Boyer | 407/104 |
| 3,359,612 | 12/1967 | Mina | 407/99 |
| 3,703,755 | 11/1972 | Guensche | 407/112 |
| 3,844,008 | 10/1974 | Sletten | 407/99 |

FOREIGN PATENT DOCUMENTS

| | | | |
|---|---|---|---|
| 341697 | 11/1959 | Switzerland | 407/99 |
| 549862 | 12/1942 | United Kingdom | 407/99 |
| 1088465 | 10/1967 | United Kingdom | 407/104 |

OTHER PUBLICATIONS

General Catalog No. GT5-218, G.E., Jul. 15, 1965, cover & p. 37.

Primary Examiner—Leonidas Vlachos
Attorney, Agent, or Firm—Christel, Bean & Linihan

[57] ABSTRACT

A pocket reducing insert for the pocket of an A.N.S.I. toolholder designed to nestingly accept a first cutting insert of a predetermined size and shape is in the form of a notched body of such size and shape to be nestingly received within the toolholder pocket, and the notch of the body is of such size and shape to nestingly accept a second cutting insert of smaller size or smaller size and different shape than the one which the A.N.S.I. toolholder is designed to accept. When the reducing insert is placed within the toolholder pocket, the toolholder pocket can nestingly accept the second cutting insert. An associated clamping assembly when used in combination with the reducing insert, for holding the second cutting insert within the toolholder pocket is particularly well-suited for use during machining operations during which machining pressure tends to pull the second cutting insert out of the pocket.

9 Claims, 10 Drawing Figures

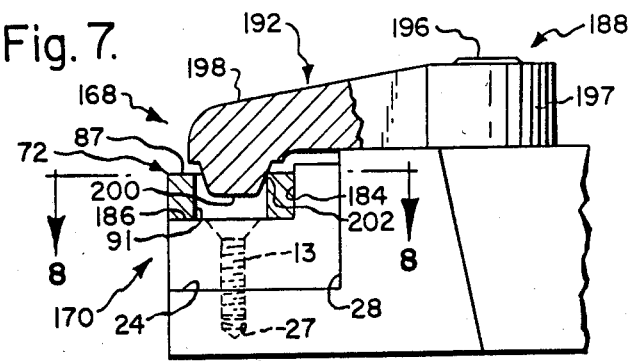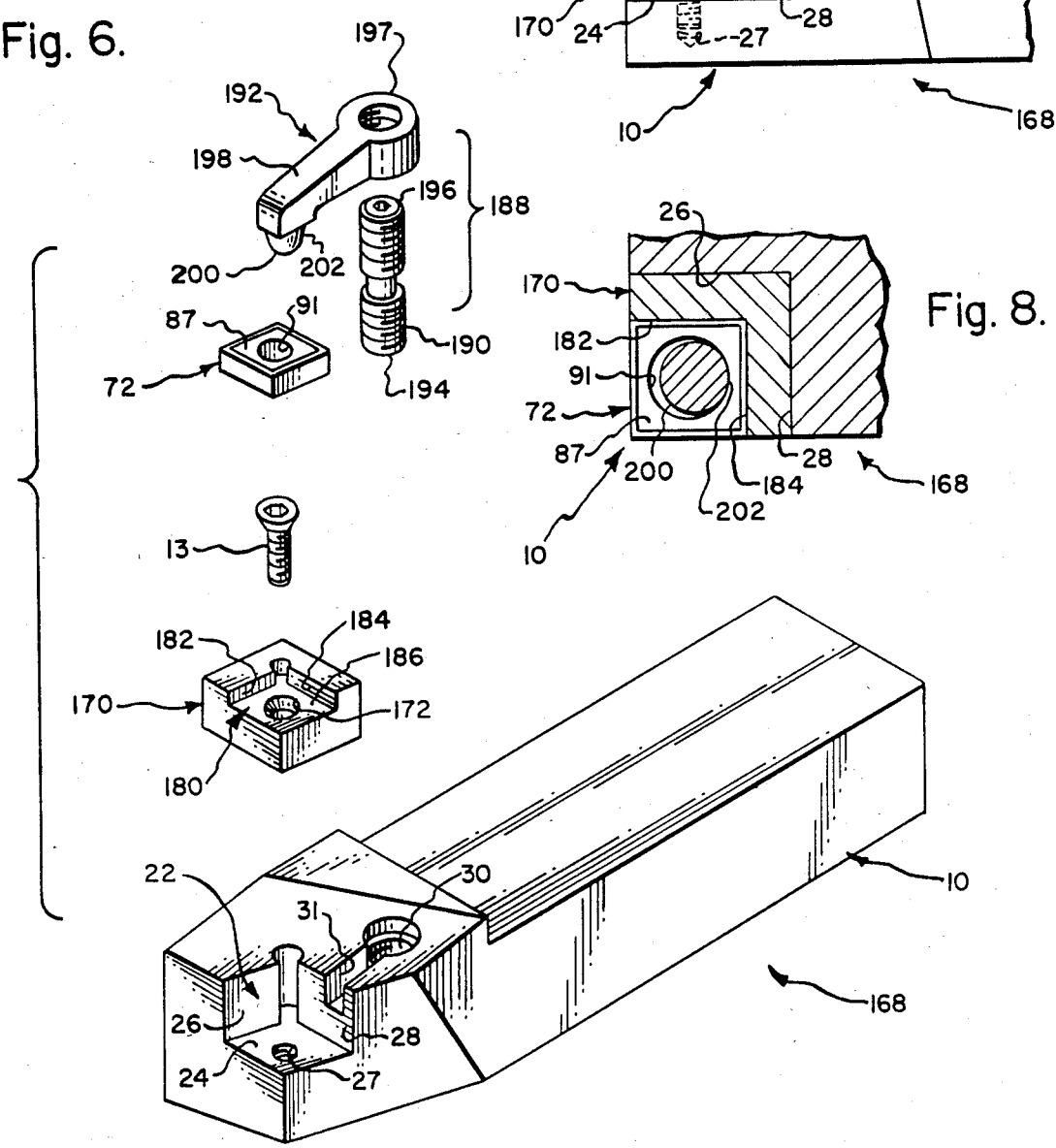

POCKET REDUCING INSERT FOR TOOLHOLDER AND THE LIKE

CROSS REFERENCE TO A RELATED APPLICATION

This application is a continuation-in-part of my application Ser. No. 581,566 filed Feb. 21, 1984, now abandoned, which is a continuation-in-part of my application Ser. No. 468,072 filed Feb. 22, 1983, now abandoned. Both of the aforesaid pending and abandoned applications are entitled POCKET REDUCING INSERT FOR TOOLHOLDER AND THE LIKE.

BACKGROUND OF THE INVENTION

The present invention relates, generally, to the machining art and relates, more particularly, to toolholders, boring bars 1 and the like for holding a cutting insert during a machining operation.

The type of toolholder with which this invention is concerned is characterized by a pocket designed to nestingly accept a cutting insert of a predetermined size and shape and an internally threaded bore spaced from the pocket for retaining an insert clamping assembly. Commonly, the insert clamping assembly includes an elongated finger or top clamp of a preselected length for engaging the cutting insert and a double-ended screw for holding the finger clamp in engagement with the cutting insert. When the cutting insert is nestingly accepted within the toolholder pocket and the preselected finger clamp is held in engagement with the cutting insert, the insert is retained between the bottom, or base, of the pocket and the finger clamp.

A toolholder of the aforedescribed type is limited in that it can only be used to accept and, with a preselected clamping assembly, hold a cutting insert of a predetermined size and shape. Such a limitation requires that if a cutting insert of a predetermined size and shape is required for a machining operation, a toolholder capable of accepting the cutting insert is also required. Therefore, the use of several cutting inserts having various shapes or sizes also requires the availability of several toolholders.

A further limitation of such a toolholder relates to its use in a numerically-controlled or computer numerically-controlled machine tool having a numerical controller which controls the relative movement between the workpiece to be machined and the cutting edge of the cutting insert in response to programmed input. It will be understood, however, that the numerical controller controls such relative movement based upon the position at which the controller believes the cutting edge of the insert is located. Thus, if a machining operation is initiated and the cutting edge of the cutting insert is not positioned where the numerical controller believes it to be, the operation will continue in error. In some machining applications, therefore, if a cutting insert mounted in a machine tool is replaced with another cutting insert, it is important that the cutting edge of the replacement insert be positioned at the location at which the cutting edge of the replaced cutting insert was positioned. If a cutting insert in a machine tool is replaced with a smaller cutting insert (i.e. one have a smaller inscribed circle), the current process involved in aligning the cutting edge of replacement cutting insert with the former position of the cutting edge of the replaced cutting insert is time-consuming and can directly affect the cost of a machined product.

It is, accordingly, an object of the present invention to provide a pocket adaptor for a toolholder as aforedescribed which enables the toolholder to accept, in addition to a first cutting insert which the pocket is designed to accept, a second cutting insert.

Another object of this invention is to provide such an adaptor for a toolholder wherein the second cutting insert is smaller than the first cutting insert and the adaptor positions the cutting edge of the second cutting insert at the location at which the cutting edge of the first cutting insert would be located if the first cutting insert were accepted within the toolholder pocket.

Yet another object of the present invention is to provide such an adaptor for a toolholder and an associated clamping assembly for tightly holding the second cutting insert within the toolholder pocket during a machining operation, such as backfacing or profiling, during which machining pressure tends to pull the insert out of the pocket.

SUMMARY OF THE INVENTION

The present invention resides in an adaptor for a toolholder or the like of the type having a pocket designed to nestingly accept a cutting insert of a predetermined size and shape and a clamp-accepting aperture spaced from the pocket.

The adaptor comprises a body of such shape to be nestingly received within the pocket of a toolholder as aforedescribed and which includes means for nestingly accepting a cutting insert having a smaller inscribed circle than that of the one which the pocket is designed to accept. The reducing insert thereby enables a single toolholder to be used to hold either of two cutting inserts.

In one aspect of the invention, the body of the adaptor, when nestingly received within the toolholder pocket, and the means for nestingly accepting, when nestingly accepting the smaller cutting insert, cooperate with one another to position the cutting edge of the smaller cutting insert at substantially the same location relative to the toolholder pocket at which the cutting edge of the cutting insert of predetermined size and shape is positioned when nestingly accepted within the toolholder pocket.

In another aspect of this invention the adaptor is used in combination with an associated clamping assembly for tightly holding or capturing the second cutting insert within the toolholder pocket. The clamping assembly includes means tightenable upon the second cutting insert so that the second cutting insert is pressed toward the bottom and a side of the toolholder pocket. This combination is particularly well-suited for use during maching operations, such as backfacing or profiling, during which machining pressure tends to pull the insert out of the pocket.

BRIEF DESCRIPTION OF THE DRAWINGS

FIG. 6 is an exploded perspective view of a toolholder assembly in which an alternative embodiment of the present invention is employed.

FIG. 7 is a fragmentary elevational view, partly in section, illustrating the toolholder assembly of FIG. 6 in assembled condition.

FIG. 8 is a cross-sectional view taken about on line 8—8 of FIG. 7.

DETAILED DESCRIPTION OF ILLUSTRATIVE EMBODIMENTS

Figure 1:
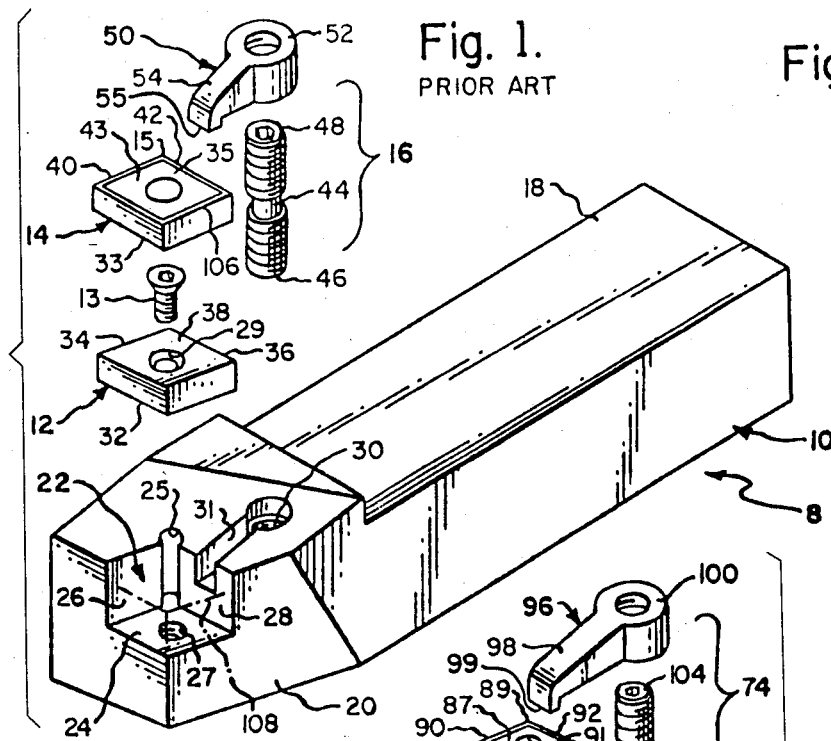
FIG. 1 is an exploded perspective view of a toolholder assembly of the prior art.

Turning now to the drawings in greater detail, there is shown in FIG. 1 a toolholder assembly, generally designed 8, of the prior art. The assembly 8 includes a toolholder 10, an optional seat or shim 12, a seat screw 13, a cutting insert 14 and a clamping assembly 16. The toolholder 10, sized in accordance with specifications set forth by the American National Standards Institute (hereinafter A.N.S.I.), is of one-piece construction and includes a shank 18 and a head 20. The shank 18 is adapted to be clamped within the tool support of a machine tool. The head 20 of the toolholder 10 defines a pocket, generally indicated 22, designed to nestingly accept the seat 12 and the cutting insert 14. The pocket 22 defines a bottom 24 and two walls 26 and 28. An elongated clearance recess 25, commonly formed by a milling process, is defined in the corner of the pocket so as to extend along an edge of the walls 26 and 28, and a threaded bore 27, adapted to threadably accept the shank of the seat screw 13, is defined in the bottom 24 of the pocket. The head 20 further defines an internally threaded aperture or bore 30 spaced from the pocket 22 for retaining the clamping assembly 16. A slot 31 extends between the bore 30 and the pocket 22 for a reason set forth hereinafter.

The seat 12 is comprised of a non-cutting grade of carbide and defines a countersunk hole 29 and substantially square upper and lower surfaces or faces 38 and 32, respectively. When the seat is received within the pocket 22, its lower face 32 overlies the pocket bottom 24; two of its sides, indicated 34 and 36, abut the pocket walls 26 and 28; and its hole 29 aligns with the bore 27 in the pocket bottom. The ANSI seat screw 13 is utilized to hold the seat 12 within the pocket by screwing the shank of the screw 13 into the pocket bore 27 through the seat hole 29 so that the seat is held between the bottom of the pocket and the head of the screw 13.

The cutting insert 14 is comprised of a cutting grade of carbide or hardened carbon steel and includes a central portion which defines a center bore 35 and substantially square and parallel upper and lower faces 43 and 33, respectively. Furthermore and although not shown as such, both ends of the bore 35 are chamfered. When the cutting insert 14 is received within the pocket so that its lower face 33 overlies the upper faces 38 of the seat 12, two sides of its sides, indicated 40 and 42, abut the pocket walls 26 and 28, respectively; one of its corners, indicated 15, is positioned within the clearance recess 25; and its center bore 35 aligns with the hole 29 of the seat 12.

The cutting insert 14 is retainable within the toolholder pocket with the clamping assembly 16. The clamping assembly 16 is comprised of a double-ended screw 44 and a top clamp 50. The screw 44 defines two opposite ends 46,48, and the clamp 50 includes an attachment end portion 52 and an elongated finger portion 54. One end 46 of the screw 44 is adapted to be threadably received within the threaded bore 30 of the toolholder head 20, and the other end 48 of the screw 44 is adapted to be threadably received within the threaded bore of the clamp end portion 52. The finger portion 54 has a free end 55 which is substantially planar and, as shown in FIG. 1, faces downwardly.

The steps involved in clamping the insert 14 within the toolholder pocket include an initial step of screwing one screw end 46 part way into the toolholder bore 30 and then screwing the clamp end portion 52 part way onto the other end 48 of the screw. The clamp finger portion 54 is then positioned so as to align with the slot 31 and to span part of the upper face 42 of the cutting insert 14. When the clamp portion 52 is threadably accepted by the screw 44, the clamp free end 55 is oriented parallel to the upper face 43 of the cutting insert. The screw 44 is subsequently tightened within the bore 30 to move the free end 55 toward and into engagement with the upper face 43 as the finger portion 54 is guided between the walls of the slot 31. The clamp end 55 moves along a substantially linear path as the screw 44 is tightened, and this path of movement of the free end 55 is substantially perpendicular to the bottom 24 of the toolholder pocket 22. As the finger portion 54 is guided as aforesaid, the plane of the clamp free end 55 remains parallel to the upper face 43 of the cutting insert 14. It follows that when in engagement, the clamp free end 55 and the cutting insert face 43 flatly engage one another, and when tightened, the screw 44 presses the clamp free end 55 upon the cutting insert 14 along a line of force which is perpendicular to the bottom 24 of the toolholder pocket 22 to thereby clamp the cutting insert 14 between the pocket bottom 24 and the clamp finger portion 54. Instead of employing the seat screw 13 or the combination of the seat screw 13 and clamping assembly 16 to retain the seat 12 and cutting insert 14 within the toolholder pocket, a pinlock (not shown) adapted to extend through the aligned bore 35 of the cutting insert and hole 29 of the seat and be fastened within the bore 27 in the bottom of the pocket can be used.

Figure 2:
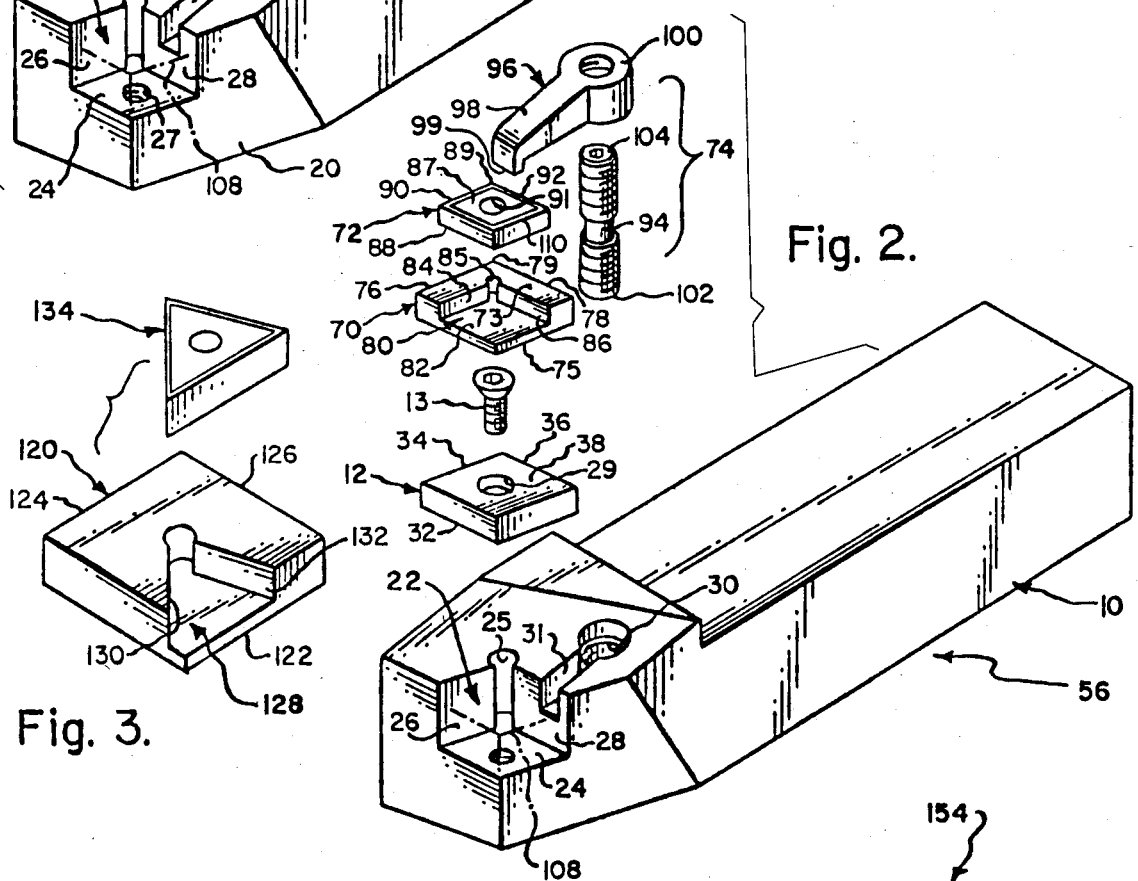
FIG. 2 is an exploded perspective view of a toolholder assembly in which an embodiment of the present invention is employed.

There is shown in FIG. 2 a toolholder assembly, indicated 56, incorporating an adaptor or pocket reducing insert 70 according to the present invention. In addition to the pocket reducing insert 70, the assembly 56 includes the FIG. 1 toolholder 10, seat 12 and seat screw 13, accordingly given the same reference numerals, a cutting insert 72 and a clamping assembly 74.

The pocket reducing insert is comprised of a body of hard material which is preferably highly resistant to breakage, deformation and abrasive wear. A material such as 1018 carbon steel, oil hardened to a hardness of fifty-five on a Rockwell "C" scale, can be used to comprise the reducing insert although other materials, such as powdered metal, can be used. As shown, the reducing insert defines an L-shaped upper surface 73, a square lower surface 75, and back sides 76 and 78 oriented substantially perpendicular to the lower face 75 and to one another. When the reducing insert 70 is received within the toolholder pocket 22, the lower face 75 overlies the upper face 38 of the seat, the two back edges 76 and 78 abut the pocket walls 26 and 28, respectively, and a corner, indicated 79, of the reducing insert 70 is positioned within the clearance recess 25 of the pocket. It will be understood, therefore, that the reducing insert 70 is of such size and shape to be nestingly received within the toolholder pocket 22 and that the lower face and sides of the reducing insert provide the means whereby it can be nestingly received as aforesaid.

The reducing insert further defines a notch 80 for nestingly accepting, or capturing, the cutting insert 72. The notch defines a bottom surface 82, the two walls 84 and 86 oriented substantially perpendicular to the bottom surface 82 and to one another, and an elongated clearance recess 85, as shown.

The cutting insert 72, similar in shape to the cutting insert 14 of FIG. 1, is comprised of a cutting grade of carbide or hardened carbon steel and, as shown in FIG. 2, defines square upper and lower faces, indicated 87 and 88, respectively, and a central portion defining a bore 91. However, the cutting insert 72 is smaller than the cutting insert 14 in that it has a smaller inscribed circle. An inscribed circle is the diameter of the largest circle which can be inscribed within the perimeter of a face of the cutting insert. When the cutting insert 72 is received within the notch 80, the lower face 88 of the cutting insert 72 overlies the bottom surface 82 of the notch; two of its sides, indicated 90 and 92, abut the notch walls 84 and 86, respectively; and one of its corners, indicated 89, is positioned within the clearance recess 85.

The seat 12 is retainable within the toolholder pocket 22 with the seat screw 13 as set forth above, and the reducing insert 70 and cutting insert 72 are retainable within the pocket with the clamping assembly 74. The assembly 74 is comprised of a double-ended screw 94 and a top clamp 96. The screw 94 defines two opposite ends 102,104, and the clamp 96 includes an elongated finger portion 98 and an attachment end portion 100 having an internally threaded bore. One end 102 of the screw 94 is adapted to be threadably received within the toolholder bore 30, and the other end 104 of the screw 94 is adapted to be threadably received within the bore of clamp end portion 100. The clamp finger portion 98 has a free end 99 which is substantially planar and, as shown in FIG. 2, faces downwardly.

The steps involved in clamping the reducing insert 70 and cutting insert 72 within the toolholder pocket include an initial step of screwing one screw end 102 part way into the toolholder bore 30 and then screwing the clamp end portion 100 part way onto the other screw end 104. The clamp finger portion 98 is then positioned so as to align with the toolholder slot 31 and to span part of the upper surface, indicated 73, of the reducing insert 70 and the upper face 87 of the cutting insert 72. The screw 94 is subsequently tightened within the bore 30 to press the clamp finger portion 98 into engagement with the upper face 87 as the finger portion 98 is guided between the walls of the slot 31. When tightened, the screw 94 presses the clamp free end 99 upon the cutting insert 72 along a line of force which is perpendicular to the bottom 24 of the toolholder pocket 22 to thereby clamp the cutting insert 72 and the reducing insert 70 between the clamp finger portion 98 and the pocket bottom 24.

Because the reducing insert 70 adapts the toolholder pocket to accept a cutting insert 72, the toolholder 10 can be used, with an available reducing insert 70, to hold either of the two cutting inserts 14 or 72. Since the cost of the reducing insert 70 is generally less than that of a second toolholder having a pocket designed to nestingly accept a cutting insert 72, it is more economical to purchase or make available the reducing insert 70 to adapt the toolholder pocket 22 than it is to purchase the second toolholder.

A further advantage of the adaptability of a single toolholder to hold two cutting inserts relates to the process involved in replacing a cutting insert held within the toolholder which is, in turn, mounted in a machine tool. If, for example, the toolholder 10 with the cutting insert 14 is mounted within a machine tool, the cutting insert 14 can be replaced with the reducing insert 70 and cutting insert 72 without removing the toolholder from its mounting in the machine tool. Such an exchange of cutting inserts may be desired in machining applications which require a first cutting insert to rough out a workpiece and then a second and smaller cutting insert to finish the workpiece, or to adapt a machine tool tooled up for cuts of a particular depth to cut depths smaller than the particular depth. Likewise, if the toolholder 10 with the cutting and reducing inserts 70 and 72 are mounted within a machine tool, the cutting insert 72 and reducing insert 70 can be replaced with the cutting insert 14. It is believed that the time required to exchange the cutting insert 14 with the cutting insert 72 and reducing insert 70, or vice versa, within the toolholder pocket 22 while the toolholder 10 is mounted within a machine tool is less than the time required to replace the toolholder 19 with a second toolholder, and that, therefore, the down time of the machine tool between successive machining operations requiring cutting inserts 14 and 72 is less than such down time in machining applications in which two toolholders are used. Of course, if the reducing insert 70 lessens the down time of a machine tool, the cost involved in machining the workpiece is lessened.

Another advantage of the adaptability of a single toolholder to hold both a large and small cutting insert relates to the ability to reduce the expense of new cutting inserts for replacing used or worn out cutting inserts. It is generally accepted that the cost of a larger cutting insert is greater than the cost of a smaller one, and that, therefore, if a large cutting insert can be easily replaced, as in the manner described above, with a smaller, and more inexpensive, one for applications in which use of the smaller one will suffice, the life of the large insert will be increased and the ultimate costs of replacement inserts will be reduced.

A still further advantage of the aforedescribed adaptability relates to the stability and rigidity of a cutting insert during a machining operation. It is generally accepted that a larger toolholder is more rigidly held within the mounting of a machine tool during a machining operation than is a smaller toolholder. Therefore, if the toolholder 10 is larger than the second toolholder designed to nestingly accept the cutting insert 72 and if the cutting insert 72 is required for machining, the reducing insert 70 enables the toolholder 10 to be used to more rigidly hold the insert 72 than it would be held if the second toolholder were used.

There is shown within the toolholder pocket 22 of FIGS. 1 and 2 a dotted line segment 108 positioned in relation to the pocket 22 along which the cutting edge, indicated 106, of the FIG. 1 cutting insert 14 is located when clamped within the pocket 22. In accordance with this invention and as shown by the reducing insert 70 of FIG. 2, the notch walls 84 and 86 are arranged in such a spaced parallel relationship with the reducing insert sides 76 and 78, respectively, and the bottom surface 82 of the notch is arranged in such a spaced parallel relationship with the lower face 75 of the reducing insert that the reducing insert, when nestingly received within the toolholder pocket and when nestingly accepting the cutting insert 72, positions the cutting edge, indicated 110, of the cutting insert 72 along the segment 108. Because the cutting insert edge 110 is shorter than the cutting insert edge 106, however, it will be understood that the length along the segment 108 which the cutting edge 110 of the cutting insert 72 can extend is shorter than the length along which the cutting insert edge 106 can extend. This edge-positioning feature of the reducing insert ensures that the location of the cutting edges of the cutting inserts 14 and 72 relative to the toolholder 10 are substantially the same if the cutting inserts 14 and 72 are exchanged within the toolholder pocket. This advantage is readily appreciated if the toolholder 10 is mounted within a numerically-controlled or computer numerically-controlled machine tool having a numerical controller, which, during a machining operation, moves a workpiece and the cutting insert relative to one another based upon where the controller believes the cutting edge of the cutting insert is located. The reducing insert 70 permits the cutting inserts 14 and 72 to be exchanged within the toolholder pocket with only minor adjustments or none at all being made to the machine tool offsets in order to compensate for a minor change in the cutting edge position. The necessity of making such offset adjustments is dependent upon the cumulative tolerances of the pocket reducing insert and the smaller cutting insert and the allowed tolerances of the parts being machined. If the allowed tolerances of the parts being machined are great enough, such as, for example, ±0.005 inches (0.13 mm), no adjustment to the existing machine tool offsets are required when the cutting inserts 14 and 72 are exchanged.

Figure 5:
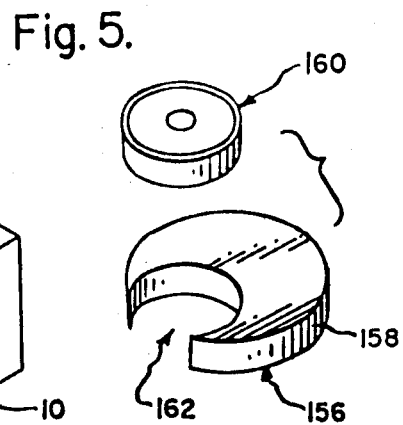
FIG. 5 is a perspective view of a further alternative reducing insert in accordance with the present invention and a cutting insert which this reducing insert is adapted to accept.
Figure 3:
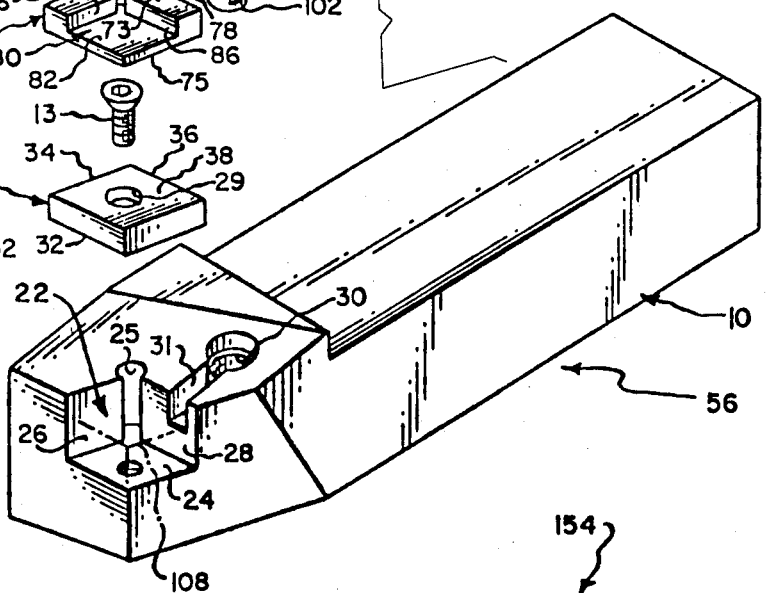
FIG. 3 is a perspective view of an alternative reducing insert in accordance with the present invention and a cutting insert which this reducing insert is adapted to accept.
Figure 4:
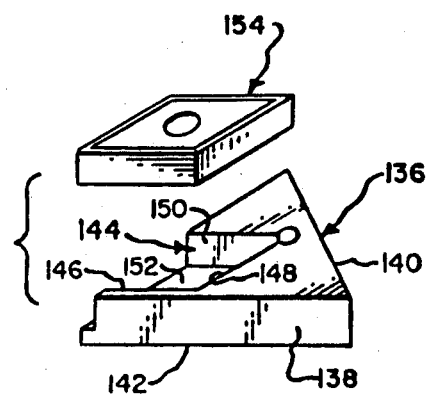
FIG. 4 is a perspective view of still another alternative reducing insert in accordance with the present invention and a cutting insert which this reducing insert is adapted to accept.

With reference to FIGS. 3–5, there are shown alternative embodiments of the pocket reducing insert of this invention. There is shown in FIG. 3 a reducing insert indicated 120 having a substantially square-shaped bottom surface 122 and two back sides 124 and 126 adapted to be nestingly received within a toolholder whose pocket is designed to nestingly accept a square-faced cutting insert and further having a notch, indicated 128, defining two walls 130 and 132 adapted to nestingly accept a triangular-shaped cutting insert, indicated 134. There is shown in FIG. 4 a reducing insert 136 having a substantially triangular-shaped bottom surface 142 and two back sides 138 and 140 adapted to be nestingly received within a toolholder whose pocket is designed to nestingly accept a triangular-shaped cutting insert and further having a notch 144 defining three wall surfaces 146, 148, 150 and a bottom surface 152 for nestingly accepting a diamond-shaped cutting insert, indicated 154. There is shown in FIG. 5 a reducing insert 156 having a somewhat crescent-shaped bottom surface 157 and a curved back 158 adapted to be nestingly received within a toolholder whose pocket is designed to nestingly accept a round-faced cutting insert. The reducing insert 156 further has a notch 162 for nestingly accepting a round-faced cutting insert, indicated 160.

Although the pocket reducing insert 70 has been described in the FIG. 2 embodiment as adapting a toolholder pocket to, in addition to accepting a square-faced cutting insert, hold a smaller square-faced cutting insert, it follows from the descriptions above of the embodiments of FIGS. 3–5 that this invention is not limited to applications involving square-faced or even similarly-faced cutting inserts. Furthermore, the embodiment of FIG. 5 demonstrates that a notch of a reducing insert in accordance with this invention does not necessarily include a bottom surface, as does the embodiments of FIGS. 2–4.

With reference to FIG. 6, there is shown a toolholder assembly, indicated 168, incorporating a pocket reducing insert 170 having a notch 180 defining two sides 182, 184 and a bottom 186. The reducing insert 170 further has a defined opening 172 as shown. In addition to the pocket reducing insert 170, the assembly 168 includes the FIG. 2 toolholder 10, seat screw 13, and a cutting insert 72, accordingly given the same reference numerals. The assembly 168 also includes a clamping assembly 188 described in greater detail hereinafter. When the pocket reducing insert 170 is nestingly received within the toolholder pocket 22, its defined hole 172 aligns with the threaded bore 27 defined in the bottom of the pocket 22. The shank of the seat screw 13 is accepted by the defined hole 172 and is threadably received within the pocket bore 27 to thereby retain the pocket reducing insert 170 between the head of the seat screw 13 and the bottom 24 of the pocket 22.

With reference to FIGS. 6–8, the clamping assembly 188 includes a double-ended screw 190 and a top clamp 192. The screw 190 defines two opposite ends 194, 196, and the clamp 192 includes an attachment end portion 197 having an internally threaded bore and an elongated finger portion 198. One end 194 of the screw 190 is adapted to be threadably received within the threaded bore 30 of the toolholder head 20, and the other end 196 of the screw 190 is adapted to be threadably received within the bore of the clamp attachment end portion 197. The finger portion 198 includes a free end portion 200 in the form of a truncated cone, and the clamp 192 is of such length that when the toolholder assembly 168 is assembled, the clamp 192 extends from the screw 190 and across the upper face 87 of the cutting insert 72 so that its conical end portion 200 is received by the cutting insert bore 91, as shown in FIG. 7.

As shown in FIGS. 7 and 8 toolholder assembly 168, the conical end portion 200 has a surface 202 which is inclined relative to the cutting insert bore 91 and which engages the upper edge of the bore 91 on the side of the bore 91 closest to the notch side 184.

The steps involved in clamping the cutting insert 72 within the reducing insert notch 180 with the clamping assembly 188 include an initial step of screwing one screw end 194 part way into the toolholder bore 30 and then screwing the clamp attachment end portion 197 part way onto the other screw end 196. The clamp finger is then positioned so as to span part of the upper face 87 of the cutting insert 72 and so that its conical end portion 200 is positioned in substantial alignment with the bore 91 of the cutting insert 72. The screw 190 is subsequently tightened within the bore 30 to move the surface 202 of the clamp conical end portion 200 into engagement with the edge of the cutting insert bore 91.

The path of movement followed by the surface 202 as the screw 190 is tightened is substantially linear and substantially perpendicular to the bottom 24 of the toolholder pocket 22. As the screw 190 is tightened, however, the clamp finger portion 198 can pivot slightly about the screw 190 relative to the toolholder 10 in a self-aligning action as the conical portion surface 202 seeks and presses against the portion of the upperedge of the cutting insert bore 91 positioned closest to the notch side 184.

As the screw 190 is tightened and the surface 202 of the clamp conical end portion 200 is in engagement with the central portion, or, more specifically, the upper edge of the bore 91 of the cutting insert 72, the cutting insert 72 is pressed along a line of force which is believed to have a component directed toward the notch bottom 186, or downwardly as viewed in FIG. 7, and a component which is directed toward the notch side 18, or to the right as viewed in FIG. 7. Thus, as the screw 190 is tightened, the cutting insert 72 is pressed by the clamp 192 against the notch bottom 186 and notch side 184. When the screw 190 is fully tightened, therefore, the cutting insert 72 is tightly held between the notch bottom 186 and the clamp finger portion 198 and is tightly held between the notch side 184 and the clamp finger portion 198.

It is known that machining pressures exerted upon a cutting insert during any of several machining operations tend to pull the cutting insert out of the toolholder pocket. Such machining operations include backfacing, profiling, and operations involving relatively heavy force conditions. The toolholder assembly 168 is particularly well-suited for use during such a machining operation because the insert-holding force of the clamp 192 at least partially counters the machining pressure which tends to pull the cutting insert out of the toolholder pocket.

Figure 9:
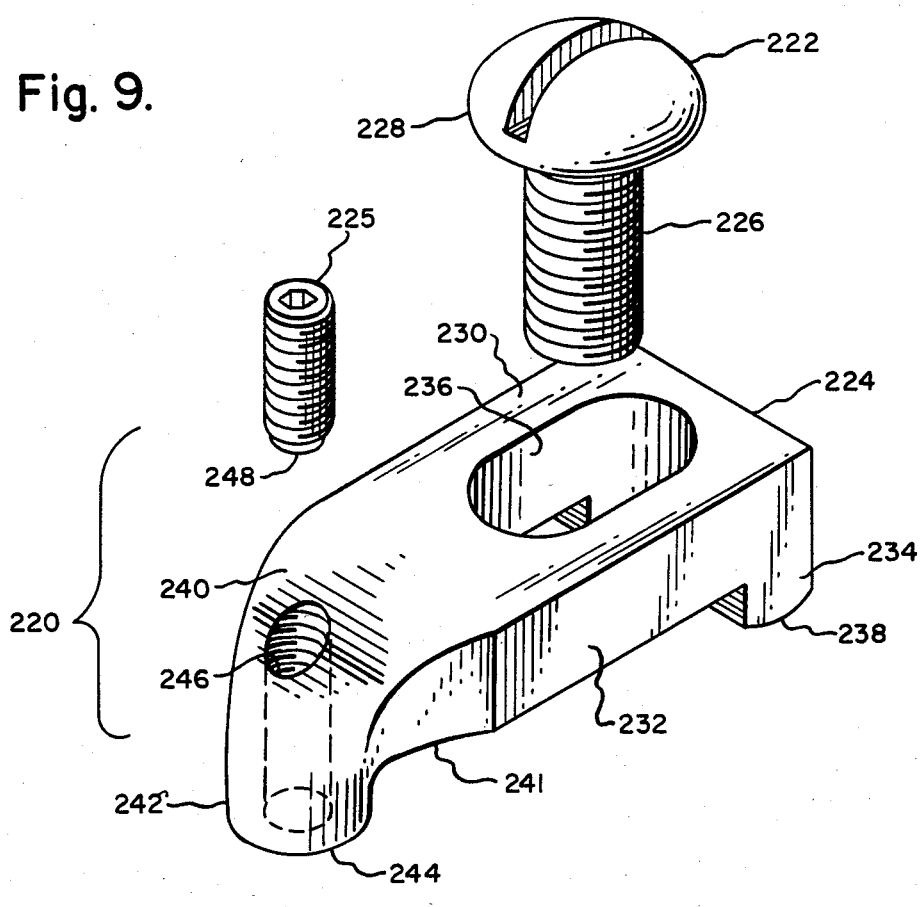
FIG. 9 is an exploded perspective view of an alternative clamping assembly for use with the FIG. 6 toolholder assembly.
Figure 10:
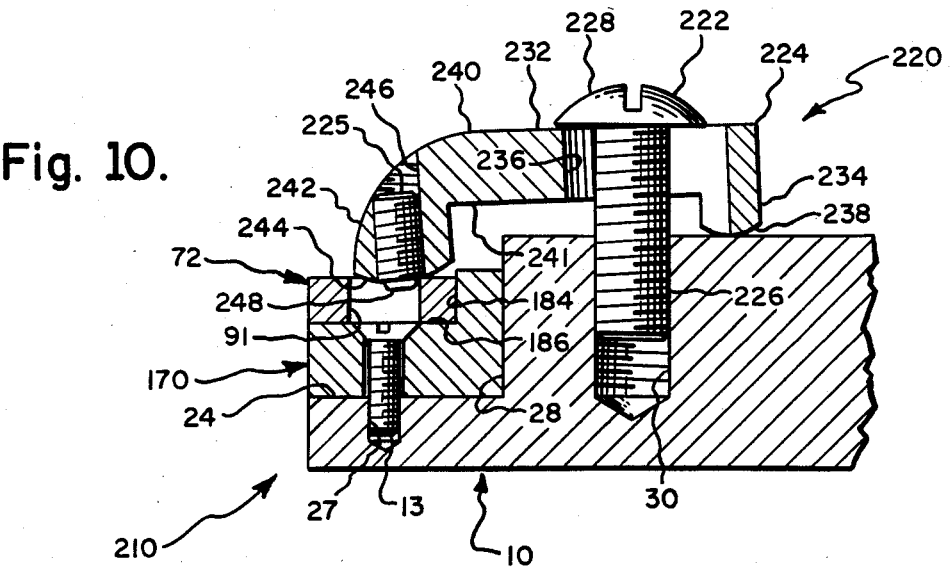
FIG. 10 is a view similar to FIG. 7, partly in section, illustrating an alternative toolholder assembly in assembled condition and which utilizes the clamping assembly of FIG. 9.

With reference to FIGS. 9-10, there is shown an alternative clamping assembly, indicated 220, which can be substituted for the clamping assembly 188 of the toolholder assembly 168 of FIGS. 6-8. FIG. 10 illustrates a toolholder assembly, indicated 210, in which the clamping assembly 220 is utilized. The components of the toolholder assembly 210 which correspond to those of the FIG. 2 toolholder assembly 56 are accordingly given the same reference numerals. The clamping assembly 220 includes a first screw means in the form of a button-head screw 222, a top clamp 224 and a second screw means in the form of a set screw 225. The button-head screw 222 includes a head 228 and a threaded end 226 adapted to be threadably received by the toolholder bore 30.

The top clamp 224 includes an attachment end portion 230 having a relatively broad, planar section 232 and a leg section 234 extending perpendicularly of the planar section 232 so as to provide the attachment end portion 230 with a L-shaped cross section. The planar section 232 defines a through-slot 236 extending along its length of said width to closely accept the threaded end 226 of the button-head screw 226. The leg section 234 is substantially planar with a downwardly-facing, as shown in FIGS. 9 and 10, curved surface 238. The curved surface 238 has a radius of curvature which is substantially constant between the two opposite sides of the attachment end portion 230.

The top clamp 224 further includes an elongated finger portion 240 attached to and extending from the planar section 232 of the attachment end portion 230. The finger portion 240 includes a tapered section 241 and an elongated free end section 242 and defines a crook therebetween so that the free end section 242 extends generally perpendicular to the tapered section 241. Furthermore, the free end section 242 is so oriented in relationship to the attachment end portion 230 of the top clamp 224 that its longitudinal axis is arranged generally perpendicular to the plane of the attachment end planar section 232 and generally parallel to the plane of the attachment end leg section 234. The free end section 242 defines a downwardly-facing, as shown in FIGS. 9 and 10, rounded surface 244.

Defined in the finger free end section 242 and extending along its longitudinal axis is an internally-threaded bore 246. The bore 246 is adapted to threadably receive the set screw 227. The set screw 227 is oriented within the bore 244 so that its leading, or beveled, end 248 faces in the same direction as does the rounded surface 244.

With reference to FIG. 10, the steps involved in clamping the cutting insert 72 within the reducing insert notch 180 with the clamping assembly 220 includes an initial step of turning the set screw 225 relative to the top clamp 224 in an appropriate direction until the leading end 248 of the screw 225 protrudes slightly beyond the rounded surface 244 of the top clamp finger free end section 242. The protruding leading end 238 of the set screw 225 is then placed within the bore 91 of the cutting insert 72, and the attachment end portion 230 of the top clamp is rotated about the finger free end section 242 of the top clamp attachment end portion 230. The threaded end 226 of the button-head screw 222 is then inserted through the slot 238 and started within the toolholder bore 30, and the top clamp 224 is shifted, if necessary, so that the set screw 225 engages the upper edge of the cutting insert bore 91 located on the side of the bore 91 closest to the notch side 184 or the toolholder bore 30.

At that point the curved surface 238 of the top clamp attachment end portion 230 rests upon the top of the toolholder 10 and makes engagement therewith along a line, and the rounded surface 244 of the clamp elongated finger portion 240 makes engagement with the upper surface of cutting insert 72 at a point. The planar and tapered sections 232,241 of the top clamp 224 located between the finger free end section 242 and the leg section 234 are spaced from the top of the cutting insert 72, the pocket reducing insert 170 and the toolholder 10, and are generally positioned at an angle in relation to the longitudinal axis of the bore 91 of the cutting insert 91. It will be understood that the angular relationship between the top clamp 224 and the cutting insert bore 91 places the longitudinal axis of the internally-threaded bore 246 of the finger free end section 242 at an inclined angle in relation to the toolholder bore 30 and pocket side 28.

The button-head screw 228 is then tightened within the toolholder bore 30 so that its head 228 presses against the attachment end portion 230 of the top clamp 224 and so that the rounded surface 244 and curved surface 238 press firmly against the cutting insert 72 and the top surface of the toolholder 10, respectively. As the rounded surface 244 presses against the cutting insert 72, the cutting insert 72, is pressed along a line of force which is believed to be directed toward the notch bottom 186, or downwardly as viewed in FIG. 10. Thus, as the screw 28 is tightened, the cutting insert 72 is held by the top clamp 224 against the notch bottom 186 and against the toolholder pocket bottom 24. When the screw 228 is fully tightened, the cutting insert 72 and reducing insert 170 are tightly held between the pocket bottom 24 and the clamp finger portion 240.

Because the clamping assembly 220 satisfactorily holds the cutting insert 72 and reducing insert 170 within the toolholder pocket 22, it will be understood that the seat screw 13 shown in FIG. 10 holding the reducing insert 170 within the toolholder pocket 22 is optional. The reducing insert-holding capacity of the clamping assembly 220 is therefor advantageous in that any need for the seat screw 13 is obviated and permits the clamping assembly 220 to be utilized with toolholders which do not include a pocket bore similar to that of bore 27 of toolholder 10.

The set screw 225 provides means for pressing the cutting insert 72 against both the pocket bottom 24 and side 28. More specifically, the set screw 225 can be rotated relative to the clamp finger portion 240 in an appropriate direction so that the leading end 248 of the set screw 225 is tightened against the upper edge of the cutting insert bore 91 situated closest to the notch side 184. Because the leading end 248 of the set screw 225 is inclined in relationship to the cutting insert bore 91 at the point of engagement therebetween, the tightening of the set screw 225 presses the cutting insert 72 along a line of force which is believed to have a component directed toward the ntoch bottom 186, or downwardly as viewed in FIG. 10, and a component which is directed toward the notch side 184 or to the right as viewed in FIG. 10.

Thus, as the set screw 225 is tightened, the cutting insert 72 is pressed against the notch bottom 186 and notch side 184 as the set screw 225 acts between the cutting insert 72 and the top clamp 224. When the set screw 225 is fully tightened, the cutting insert 72 is tightly held between the notch bottom 186 and the clamp finger portion 240 and is tightly held between the notch side 184 and the clamp finger portion 240. As is the toolholder assembly 168 of FIGS. 6-8, the toolholder assembly 210 of FIGS. 9 and 10 is particularly well-suited for use during a machining operation, such as backfacing or profiling, during which machining pressure tends to pull the cutting insert 72 out of the toolholder pocket 22.

The clamping assembly 220 of FIGS. 9 and 10 provides an advantage over the clamping assembly 188 of FIGS. 6-10 in that it can be utilzied with toolholders and cutting inserts over a broad range of sizes and shapes. A top clamp 224 with the following illustrative dimensions has been found to be usable with many toolholder cutting insert combinations. The overall length of the top clamp 224 is 1.75 inches (4.45 cm). The thickness of the attachment end planar section 232 and the tapered section 241 is about 0.3 inches (0.8 cm). The distance the attachment end leg section 234 extends at a right angle from the planar section 232 is about 0.13 inches (0.32 cm), and the width of the leg section 234 is 0.25 inches (0.64 cm). The radius of curvature of the curved surface 238 is 0.75 inches (1.9 cm). The length of the slot 236 is 1.0 inches (2.5 cm) and the width of the slot 236 is 0.4 inches (1.0 cm). The diameter of the finger free end section 242 is 0.38 inches (0.97 cm) and the distance that the finger free end section 242 extends at a right angle from the tapered section 241 is about 0.25 inches (0.64 cm), and the internally-threaded bore 246 accepts a 10-24 thread.

It will also be understood that the present invention has been described in various embodiments but that many changes may be made to the embodiment without departing from the spirit of the invention. For example, inasmuch as the pocket 22 of the toolholder 10 in FIGS. 6-8 defines a bore adapted to threadably accept the shank of a seat screw for holding a seat, as in FIGS. 1 and 2, or a reducing insert, as in FIGS. 6-8, within the toolholder pocket 22, it will be understood that both a seat and a reducing insert can be held within the toolholder pocket 22 by a single screw. Such a recucing insert has a thickness which compensates from the thickness of the seat so that the collective thickness of the seat and reducing insert positions the cutting insert at the desired location relative to the toolholder pocket.

It will also be understood that although the reducing insert 70 has been described as employable with an A.N.S.I. toolholder 10, as shown, a reducing insert in accordance with this invention is employable with cartridges, boring bars and other types of A.N.S.I. toolholders whose pocket is designed to accept a cutting insert of a predetermined size and shape.

Furthermore, inso much as the toolholder 10 is handed, that is, being either right-handed or left-handed, a reducing insert in accordance with this invetion is employable with non-handed types of toolholders. Accordingly, the aforedescribed embodiments are intended for purposes of illustration, rather than limitation.

I claim:

1. In combination, a toolholder or the like of the type including a pocket designed to nestingly accept a first cutting insert of a predetermined size and shape and a clamp-accepting aperture spaced from said pocket, said toolholder pocket having a bottom and two walls which are angularly disposed to one another to nestingly accept a first cutting insert of a predetermined shape and size so that when the first cutting insert is operatively accepted by said pocket, angularly-disposed sides of the cutting insert abut said angularly-disposed walls of said pocket, said clamp-accepting aperture being internally-threaded and one wall of said pocket generally facing away from the longitudinal axis of said clamp-accepting aperture;

an adapter including a body having two sides which are angularly disposed relative to one another, being nestingly accepted within said toolholder pocket with each of said body sides in abutting engagement with a corresponding one of said pocket walls and defining a notch;

a second cutting insert having an upper face and a lower face, being nestingly accepted within said adapter notch and including a central portion defining a bore extending between said upper and lower faces; and a clamping assembly including screw means in the form of a fastener having a head and a threaded shank extending from said head, said shank being threadably received by said clamp-accepting aperture and insert-engaging means secured to said screw means, said insert-engaging means including a top clamp having an attachment portion and an elongated finger portion extending from said attachment portion, said attachment portion defining a slotted aperture through which said fastener shank is closely received so that said attachment portion is retained between said fastener head and said toolholder, said slotted aperture permitting adjustment of the distance between said elongated finger portion and said fastener shank as said slotted aperture of said attachment portion is guidedly moved along said fastener shank, said elongated finger portion defining a rounded surface for operatively engaging said central portion of said second cutting insert and an internally-threaded bore opening through said rounded surface, said insert-engaging means further including a set screw threadably received by said internally-threaded bore and positionable at a condition at which an end of said set screw protrudes slightly beyond said rounded surface so that when assembling said combination, said set screw and said rounded surface cooperate with said bore of said second cutting insert to locate said elongated finger portion in operative relation to said second cutting insert so that subsequent tightening of said fastener within said clamp-accepting aperture firmly presses said rounded surface against second cutting insert and generally toward said pocket bottom and said one pocket wall.

2. The combination of claim 1 wherein said internally-threaded bore is inclined at such an angle in relationship to said bore of said second cutting insert that when said second cutting insert is firmly pressed by said rounded surface of aforesaid, subsequent tightening of said set screw presses the protruding end thereof into engagement with said second cutting insert to further press said second cutting insert against said pocket bottom and said one pocket wall.

3. The combination of claim 1 wherein said attachment end portion defines a toolholder-engaging surface in engagement with said toolholder and arranged in relation to said shanked fastener so that the shank of said fastener is positioned generally between said toolholder-engaging surface and said rounded surface.

4. The combination of claim 1 wherein said screw means is moved relative to said toolholder along a linear path as said screw means is tightened within said clamp-accepting aperture and said rounded surface has a portion which is inclined relative to said path of movement of said screw means so that as said screw means is tigthened, said second cutting insert is pressed as aforesaid by said rounded surface.

5. The combination of claim 4 wherein said rounded surface contacts said second cutting insert at a point along the edge of said toolholder bore located closest to said clamp-accepting aperture.

6. The combination of claim 1 wherein said bore of said second cutting insert defines an upper edge and said second cutting insert is pressed as aforesaid by the cooperation between rounded surface and said upper edge of said bore.

7. The combination of claim 1 wherein said toolholder defines a screw-accepting bore in its pocket bottom, said adaptor body defines a through-hole positioned in alignment with said threaded bore of said toolholder and the combination further includes:
  a seat screw having a shank which extends through said through-hole and is threadably accepted by said threaded bore so that said adaptor body is held by said seat screw between said bottom of said pocket and the head of said seat screw.

8. An adapter kit for a toolholder or the like of the type including a pocket and defining an elongated, internally-threaded clamp-accepting aperture spaced from the pocket wherein the tooholder pocket has a bottom and at least two walls which are angularly-disposed relative to one another to nestingly accept a first cutting insert of a predetermined shape and size so that when the first cutting insert is operatively accepted by the pocket, angularly-disposed sides of the first cutting insert abut the angularly-disposed walls of the tooholder pocket, one wall of said pocket generally facing away from the longitudinal axis of the clamp-accepting aperture, said kit comprising:
  an adapter including a body having a bottom and at least two sides which are angularly disposed relative to one another and of such size and shape to be nestingly received within the pocket of such toolholder with each of said body sides abutting a corresponding one of said pocket walls and defining a notch having a bottom and at least two angularly-disposed walls and of such size and shape to nestingly accept a second cutting insert having a smaller inscribed circle than that of the first cutting insert for which such toolholder is designed, at least two angularly-disposed sides and a central bore oriented generally parallel to each of its angularly-disposed sides whereby operative positioning of said second cutting insert within said body notch places the angularly-disposed sides of said second cutting insert in abutting engagement with said angularly-disposed sides of said notch to limit the directions in which said second cutting insert can be moved relative to said body; and
  a clamping assembly including screw means in the form of a fastener having a head and a threaded shank extending from said head, said shank being threadably receivable by the clamp-accepting aperture and insert-engaging means securable to said screw means, said insert-engaging means including a top clamp having an attachment portion and an elongated finger portion extending from said attachment portion, said attachment portion defining a slotted aperture through which said fastener shank is closely receivable so that said attachment portion is retained between said fastener head and the toolholder when said fastener shank is threadably received by said clamp-accepting aperture, said slotted aperture permitting adjustment of the distance between said elongated finger portion and said fastener shank as said slotted aperture of said attachment portion is guidedly moved along said fastener shank, said elongated finger portion defining a rounded surface for operatively engaging said second cutting insert and an internally-threaded bore opening through said rounded surface, said insert-engaging means further including a set screw threadably received by said internally-threaded bore and positionable at a condition at which an end of said set screw protrudes slightly beyond said rounded surface so that when assembling said kit, toolholder and second cutting insert, said set screw and said rounded surface cooperate with said bore of said second cutting insert to locate said elongated finger portion in operative relation to said second cutting insert so that subsequent tightening of said fastener within said clamp-accepting aperture firmly presses said rounded surface against said second cutting insert and generally toward said pocket bottom and said one pocket wall.

9. The kit as defined in claim 8 wherein said internally-threaded bore is inclinded at such an angle in relationship to said bore of said second cutting insert that when said second cutting insert is firmly pressed by said rounded surface as aforesaid, subsequent tightening of said set screw presses the protruding end thereof into engagement with said second cutting insert to further press said second cutting insert against said pocket bottom and said one pocket wall.

* * * * *